Patented June 30, 1953

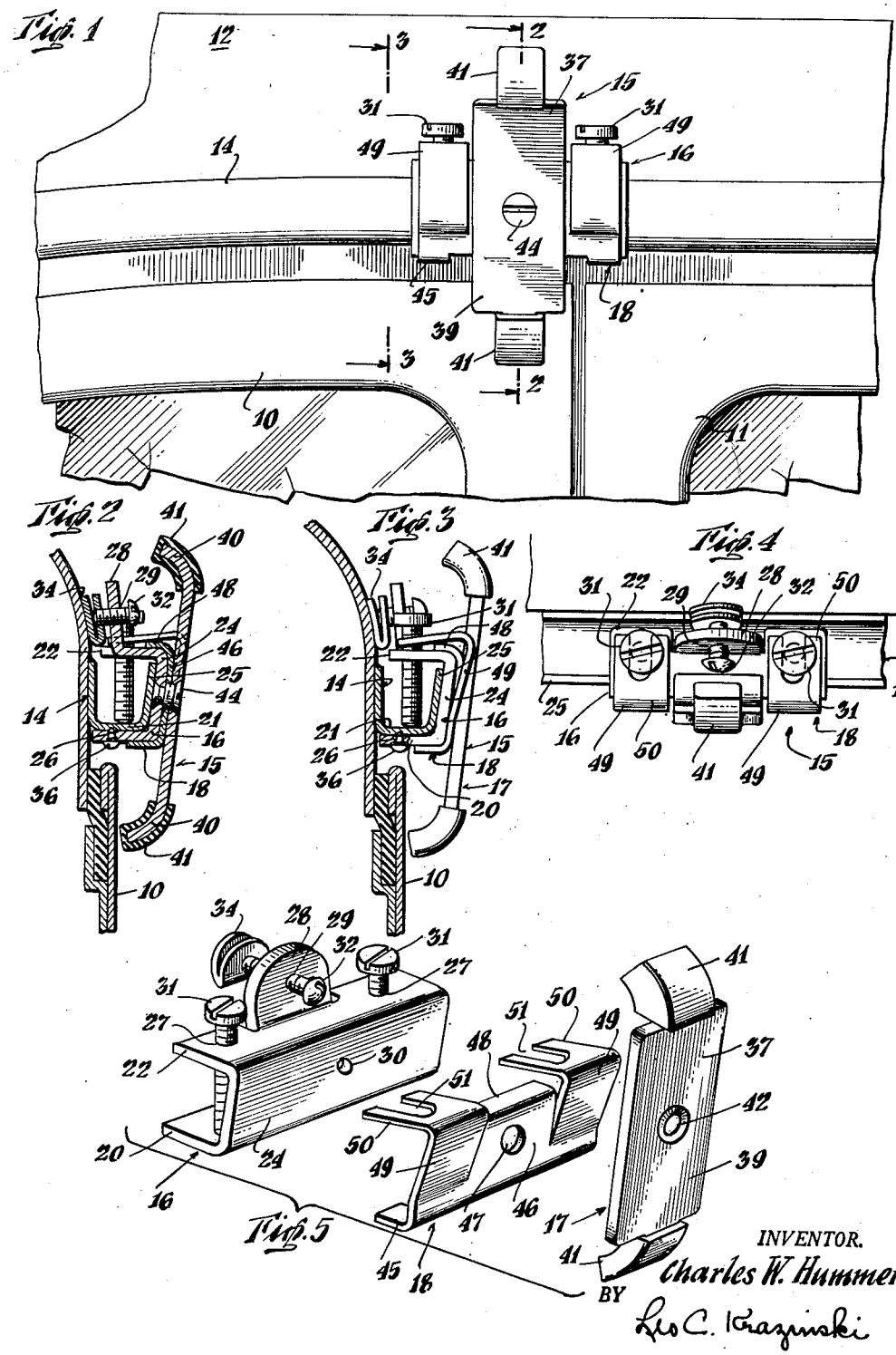

2,643,905

UNITED STATES PATENT OFFICE 2,643,905

AUTOMOBILE DOOR SAFETY LOCK

Charles W. Hummer, Woodhaven, N. Y.

Application March 27, 1952, Serial No. 278,881

8 Claims. (Cl. 292—209)

The present invention relates to door safety locks adapted for use on automobiles of the closed type having outwardly swinging doors and having a roof provided with projecting structure, such as a water channel at the edge thereof adjacently above the doors, and, more particularly, is concerned with improving locks of this type, such as illustrated in my prior United States Patent No. 2,564,600, issued August 14, 1951.

In my prior patent, there is disclosed a safety lock which is readily attached to and removed from the projecting roof structure and is so constructed as to prevent the unauthorized opening of a door from the inside of the automobile. Such a lock is particularly useful, for example, in cases where a young child is riding in the rear of the automobile and may turn the conventional inner door handle and open the door while the automobile is in motion with the possibility that the child may fall out of the automobile and be seriously injured.

The present invention aims to provide a safety lock of the foregoing character which accomplishes all the advantages of the lock disclosed in my prior patent, but embodies additional features which further enhance the utility thereof.

Accordingly, an object is to provide such a lock wherein the locking member is constructed and arranged to facilitate manipulation thereof.

Another object is to provide such a lock wherein the locking member is securely retained against unintentional displacement out of the position in which it prevents opening of a door or in which it permits the opening thereof.

Another object is to provide such a lock adapted to be secured to the water channel in a manner to prevent unauthorized removal or theft thereof.

A further object is to accomplish the foregoing in a simple, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description as is shown in the accompanying drawing, forming a part of the specification, wherein:

Fig. 1 is a fragmentary elevational view of the upper side body portion of an automobile of the closed type, illustrating a lock in accordance with the invention applied thereto.

Fig. 2 is a sectional view taken along the line 2—2 on Fig. 1.

Fig. 3 is a sectional view taken along the line 3—3 on Fig. 1.

Fig. 4 is a top plan view of the lock applied to the automobile as shown in Fig. 1.

Fig. 5 is an exploded perspective view illustrating parts of the lock in detail.

Referring to the drawing in detail, particularly Fig. 1, there is shown an upper side body portion of a conventional automobile of the closed type having outwardly swinging doors 10 and 11, and a roof 12 provided with projecting structure, such as a water channel 14 adjacently above the doors. A safety lock 15, in accordance with the invention takes advantage of the presence of the water channel, and utilizes the channel as a convenient means for anchoring the same thereto.

The lock 15 (see Fig. 5) generally comprises a body 16, a locking member 17 and a locking member retaining element 18, these elements being constructed and arranged as about to be described.

The body 16 is generally channel-shaped and includes a lower flange 20 adapted to be positioned under the bottom 21 of the water channel 14, an upper flange 22 extending across the top of the water channel, and a web 24 connecting the flanges 20 and 22, adapted to be positioned against the outer side 25 of the water channel.

The lower flange 20 has a threaded aperture 26 extending therethrough intermediate the ends thereof (Fig. 3). The upper flange 22 has a pair of threaded apertures 27 extending therethrough adjacent the respective ends thereof and has an upwardly projecting ear 28 adjacent the free edge thereof and intermediate the apertures 27, the ear being provided with a threaded aperture 29 extending therethrough. The web 24 has an aperture 30 extending therethrough intermediate the ends thereof.

In order to secure the body 16 to the water channel 14 adjacent the upper edge of the door 10, as shown herein, screws 31 are threaded into the apertures 27 with their free ends in firm engagement with the bottom 21 of the water channel (Figs. 2 and 3). A screw 32 is threaded through the aperture 29 and a U-shaped member 34, constructed of soft or compressible material, is mounted on the free end of this screw, so that the screw will not mar or scratch the surface of the roof 12. The screw 32 is then further applied whereby the member 34 will bear against and tightly engage the roof portion. The pressure of the member 34 against the roof acts to resist and counterbalance any pressure exerted by the door 10 on the locking member 17, and prevents vibration of the lock while the automobile is in motion.

If desired, the body 16 may be further secured to the channel 14 in a manner to prevent theft or unauthorized removal thereof, while the door 10 is locked (Fig. 3) by threading a bolt 36 through the aperture 26 and against the bottom 21 of the channel. Preferably, this bolt has the type of head which requires a tool of special construction to apply and remove the same, whereby an ordinary screw driver or a blade is ineffective to remove the bolt.

The locking member 17 includes a pair of opposed arms 37 and 39 each formed with an extension 40 of reduced width over which a soft or resilient rubber-like sleeve 41 is positioned to prevent marring of the surface of the door coming in contact therewith, and has an aperture 42 at the middle thereof for receiving a rivet or screw 44 secured in the body aperture 30 for pivotally mounting the member 17 thereon.

The locking member retaining element 18 is formed of somewhat resilient sheet metal and includes tab means 45 at the ends thereof extending from the lower edge beneath the lower flange 20 of the body 16 and further includes a central section 46 formed with an aperture 47 and a flange 48 at the upper end extending across the upper flange 22 of the body. The element 18 in addition includes a pair of yieldable tabs 49 spaced apart by the central section 46, which tabs are inclined slightly forwardly out of the plane of the central section, and have portions 50 extending above the upper body flange 22, preferably provided with recesses 51 for receiving the screws 31.

As shown herein, the element 18 is mounted between the web 24 of the body 16 and the locking member 17 by means of the rivet 44 which extends through the aperture 47. Pivoted movement of the element 18 is prevented by the flange 48 and tab means 45 which embrace the body flanges 22 and 20, respectively. Also, it will be noted that the central section 46 is of a width about equal to that of the arms 37 and 39 of the locking member, whereby the tabs 50 and the central section cooperate to provide a recess for receiving either of these arms while the other arm is positioned to prevent opening of the door 10 (Figs. 1 and 4).

In operation, with the lock 15 attached to the water channel 14 as shown, the locking member 17, when vertically positioned, has its lower arm 39 extending over the upper edge of the door 10 to prevent opening thereof and has its upper arm 37 in the recess provided between the tabs 49. The inner inclined edges of the tabs face the side edges of this arm to thereby retain the arm in the recess and restrain the locking member 17 against unintentional pivotal movement.

When it is desired to position the locking member 17 to permit opening of the door 10, the arms 37 and 39 provide a good manual grip whereby the locking member is readily turned into a horizontal position. As this is effected, the arms 37 and 39 bear against the tabs 49 which yield to permit the arm 37 to be released from the recess between the tabs. When the locking member is in such horizontal position, the tabs press against the arms to effectively retain them against unintentionally moving into a door locking position.

From the foregoing description, it will be seen that the present invention provides a simple, practical and economical safety lock of the character indicated herein. This lock is fool-proof, is readily installed and can be operated with a minimum of effort. The lock is rugged in construction, while yet small and compact, and can withstand such rough usage to which it may normally be subjected. The locking member is effectively retained in either its door locking or door opening position, and is readily manipulated from one of these positions to the other.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. An automobile door safety lock adapted for use on an automobile of the closed type having outwardly swinging doors and having a roof provided with projecting structure at the edge thereof adjacently above the doors, said lock comprising a body, means for securing said body to the projecting structure, a locking member pivotally mounted on said body having a pair of opposed arms one of which is adapted to be positioned over the upper edge of a door to prevent opening of the door, and a pair of spaced tabs providing a recess for receiving the other arm of said member when the first arm is in the aforementioned position and thereby serving to retain said arms in their respective positions.

2. A lock according to claim 1, wherein said tabs are yieldable.

3. A lock according to claim 2, wherein said tabs are inclined outwardly from said body.

4. A lock according to claim 3, wherein said tabs are formed on an element disposed between said body and said locking member.

5. An automobile door safety lock adapted for use on an automobile of the closed type having outwardly swinging doors and having a roof provided with projecting structure at the edge thereof adjacently above the doors, said lock comprising a body having an upper flange, a lower flange and a web connecting said flanges, means for securing said body to the projecting structure, an element adjacent said web formed with an aperture and having tab means extending beneath said lower flange and having a pair of spaced apart tabs adjacent said upper flange providing an intermediate recess adjacent said aperture, a locking member having a pair of opposed arms, and means on said web extending through said aperture for pivotally mounting said member, whereby one of said arms is adapted to be positioned over the upper edge of a door to prevent opening thereof while the other of said arms is received by said recess and retained by said tabs.

6. A lock according to claim 5, wherein said pair of tabs are yieldable.

7. A lock according to claim 6, wherein said pair of tabs are inclined outwardly from said web.

8. A lock according to claim 7, wherein said pair of tabs have a portion extending over said upper flange.

CHARLES W. HUMMER.

References Cited in the file of this patent

UNITED STATES PATENTS

| Number | Name | Date |
|---|---|---|
| 1,145,521 | Stock | July 6, 1915 |
| 2,564,600 | Hummer | Aug. 14, 1951 |
| 2,595,436 | Abdallah et al. | May 6, 1952 |